Patented June 2, 1942

2,285,359

UNITED STATES PATENT OFFICE 2,285,359

PHTHALOCYANINE SULPHONIC ACIDS

Georg Rösch, Cologne-Deutz, and Otto Bayer and Hans Hoyer, Leverkusen-I. G. Werk, Germany, assignors to General Aniline & Film Corporation, a corporation of Delaware No Drawing. Application November 25, 1938, Serial No. 242,372. In Germany November 20, 1937

6 Claims. (Cl. 260—314)

The present invention relates to the preparation of phthalocyanine sulphonic acids, more particularly of mono-, di- and trisulphonic acids, and to the new products which are obtainable thereby.

In accordance with our present invention phthalocyanine sulphonic acids are obtained by starting from a mixture of o-phthalic acids containing as substituent a sulphonic acid group or a functional derivative thereof on the one hand, and o-phthalic acids being free from such substituents on the other hand. These phthalic acids are converted into phthalocyanines in a manner known per se by heating the same with a copper compound such as cupric oxide, cuprous chloride, cupric chloride and a nitrogen containing auxiliary agent such as urea, thiourea, salts of amido sulphonic acid, imino disulphonic acid and nitrilotrisulphonic acid. The present invention is based on the discovery that the use of mixtures of o-phthalic acids of the character described results in the formation of asymmetric phthalocyanines, i. e. of products containing in the same molecule the radicals of the various o-phthalic acids employed. In accordance therewith the present invention allows one to prepare phthalocyanine mono-, di- and trisulphonic acids of a uniform composition (i. e. including isomers) containing moreover any desired other substituent or being free from other substituents. As the phthalocyanine molecule is composed of four benzene nuclei there can be prepared also phthalocyanine sulphonic acids having different substituents in each of the nuclei.

Particular importance is attached to those phthalocyanines of the benzenes series having 2 to 3 of the benzene nuclei substituted by one sulfonic acid group each, the remaining benzene nuclei being either unsubstituted or substituted by, for instance, halogens, nitro groups, alkyl groups and the like. In these products the sulfonic acid group or groups are preferably in 4-position of the benzene nuclei as is more clearly illustrated by the following formula:

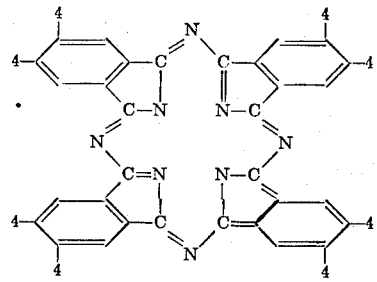

These products are distinguished by a better fastness to light than the prior known phthalocyanine sulphonic acids which have been prepared by sulphonating the ready-made phthalocyanine and contain the sulphonic acid groups mostly in 3-position.

Depending on the amount of the sulphonic acid groups which are present in the molecule the resulting products are more or less soluble in water. The di- and tri-sulphonic acids represent blue to greenish-blue substantive dyestuffs for cotton, viscose and cuprammonium silk. All products are capable of being converted into lacquer dyestuffs by treating the same with earth alkali metal salts such as calcium or barium salts. In case functional derivatives of the sulphonic acids are employed they can be converted into sulphonic acid groups either in the course of or subsequent to the reaction. Thus, sulphonic acid chloride groups are converted in the course of the reaction partly into free sulphonic acid groups and partly into sulphonamide groups. In case phthalic acid sulphonamides are employed as starting materials the resulting products can be employed per se as is more fully described in application Serial No. 209,374 to Hans Hoyer et al.

The term "functional derivatives" of sulphonic acid groups comprises for instance —$SO_2Cl$, —$SO_2.O.alkyl$ and —$SO_2.NH_2$ groups.

The following examples illustrate the present invention without, however, restricting it thereto, the parts being by weight:

Example 1

Into a melt of 300 parts of urea and 1 part of boric acid there are introduced at 150° C. 73.8 parts of 4-sulphophthalic acid ($=\frac{3}{10}$ mol) and 14.8 parts of phthalic acid anhydride ($=\frac{1}{10}$ mol). After a short time there are added 18 parts of crystallized copper chloride and 1 part of ammonium molybdate; the whole is stirred at 180–200° C. until the formation of the dyestuff is complete. On cooling the melt is boiled with concentrated hydrochloric acid and dissolved in hot water, whereupon the copper phthalocyanine trisulphonic acid (which probably has been formed as chief product) is salted out and filtered off. By dissolving in a dilute sodium carbonate solution and salting out the trisodium salt is obtained. It represents a violet powder easily soluble in water which dyes vegetable fiber blue shades; by converting the same into its earth alkaline salts vivid blue-colored pigments are obtained.

Example 2

Into a melt of 300 parts of urea and 1 part of boric acid there are introduced at 150° 49.2 parts of 4-sulphophthalic acid ($=\frac{2}{10}$ mol) and 29.6 parts of phthalic acid anhydride ($=\frac{2}{10}$ mol). After a short time there are added 18 parts of crystallized copper chloride and 1 part of ammonium molybdate; the whole is stirred at 180–200° C., until the formation of the dyestuff is complete. On cooling the melt is boiled with concentrated hydrochloric acid and filtered; the blue precipitate is then dissolved in a dilute sodium carbonate solution, whereupon the copper phthalocyanine disulphonic acid (which probably has been formed as chief product) is salted out in form of its sodium salt. The dyestuff thus obtained represents a violet powder easily soluble in water which dyes cotton and artificial cuprammonium silk vivid blue shades; in form of its earth alkaline salts the dyestuff yields vivid blue colored pigments.

*Example 3*

Into a melt of 300 parts of urea and 1 part of boric acid there are introduced at 150° C. 24.6 parts of 4-sulphophthalic acid ($=\frac{1}{10}$ mol) and 44.4 parts of phthalic acid anhydride ($=\frac{3}{10}$ mol). After a short time 18 parts of crystallized copper chloride and 1 part of ammonium molybdate are added and the whole is stirred at 180–200° C. until the formation of the dyestuff is complete. The dyestuff is then isolated as described in Example 2. The copper phthalocyanine monosulphonic acid (which is probably obtained as chief product) represents a violet powder. It is difficultly soluble in water and can be precipitated therefrom by a small addition of sodium chloride. Vegetable fiber is dyed blue shades.

*Example 4*

Into a melt of 300 parts of urea and 1 part of boric acid there are introduced at 150° C. 49.2 parts of 4-sulphophthalic acid ($=\frac{2}{10}$ mol) and 43.4 parts of 4.5-dichlorophthalic acid anhydride ($=\frac{2}{10}$ mol). After a short time there are added 18 parts of crystallized copper chloride and 1 part of ammonium molybdate; the whole is then stirred at 180–200° until the formation of the dyestuff is complete. On cooling the melt is boiled with concentrated hydrochloric acid and filtered; the blue precipitate is then dissolved in a dilute sodium carbonate solution and the tetrachloro copper phthalocyanine disulphonic acid (which is probably obtained as chief product) is salted out in form of its sodium salt. The dyestuff, which represents a violet powder easily soluble in water dyes cotton and artificial silk vivid blue shades. By converting the dyestuff into its earth alkaline metal salts there are obtained vivid blue colored pigments.

*Example 5*

Into a melt of 300 parts of urea and 1 part of boric acid there are introduced at 150° 49.2 parts of 4-sulphophthalic acid ($=\frac{2}{10}$ mol) and 43.4 parts of 3.6-dichlorophthalic acid ($=\frac{2}{10}$ mol). After a short time there are added 18 parts of crystallized copper chloride and 1 part of ammonium molybdate; the whole is stirred at 180–200° until the formation of the dyestuff is complete. The dyestuff is then isolated as described in Example 2. The tetrachloro copper phthalocyanine disulphonic acid (which is probably formed as chief product) represents a violet powder easily soluble in water which dyes vegetable fiber even blue shades.

*Example 6*

Into a melt of 300 parts of urea and 1 part of boric acid there are introduced at 150° 24.6 parts of 4-sulphophthalic acid ($=\frac{1}{10}$ mol), 32.2 parts of 4-sulphobiphenyl-3.4-dicarboxylic acid ($=\frac{1}{10}$ mol), 14.8 parts of phthalic acid anhydride ($=\frac{1}{10}$ mol) and 19.3 parts of 4-nitrophthalic acid anhydride ($=\frac{1}{10}$ mol). After a short time there are added 18 parts of crystallized copper chloride and 1 part of ammonium molybdate; the whole is then stirred at 180–200° until the formation of the dyestuff is complete. On isolating the dyestuff as described in Example 2 it represents a dark green powder which is soluble in water with a greenish-blue coloration and shows a slight affinity to the vegetable fiber. The dyestuff thus obtained is probably composed of the four above-mentioned components as follows from its solubility which corresponds to that of a disulphonic acid on the one hand, whereas on the other hand the greenish shade indicates that a diphenyl residue is present; moreover, the dyestuff contains a nitro group which has been proved by reduction to the amino group, diazotization and coupling with naphthols.

*Example 7*

|  | Parts |
|---|---|
| Phthalic acid sulphamide _____ (1 mol) | 245 |
| The diammonium salt of sulphophthalic acid | 840 |
| Urea | 3000 | are heated to 150°, whereupon there is introduced a mixture of

|  | Parts |
|---|---|
| Cuprous chloride | 200 |
| Ammonium molybdate | 10 |
| Boric acid | 10 |

The whole is then heated to 185–190°, until the formation of the dyestuff is complete. Then the melt is dissolved in hot water, acidified by means of hydrochloric acid, salted out with sodium chloride; the precipitate is filtered, redissolved in water, rendered alkaline with soda lye, filtered, salted out with common salt and dried. The dyestuff is obtained in form of a bronze violet mass which is easily soluble in water with a blue coloration and is suitable for being employed in the preparation of metal lakes.

*Example 8*

|  | Parts |
|---|---|
| Phthalic acid sulphamide | 245 |
| The diammonium salt of sulphophthalic acid | 280 |
| Urea | 1500 | are heated to 150°, whereupon there is introduced a mixture of

|  | Parts |
|---|---|
| Copper chloride | 105 |
| Ammonium molybdate | 5 |
| Boric acid | 5 | whereupon the temperature is raised to 185–190° and kept, until the formation of the dyestuff is complete. On working up as described in Example 7 the dyestuff is obtained in form of a bronze-violet-blue mass which is soluble in water with a blue coloration.

*Example 9*

A mixture of

|  | Parts |
|---|---|
| Phthalic acid sulphamide | 735 |
| The diammonium salt of sulphophthalic acid | 280 |
| Urea | 3000 | is heated to 150°, whereupon there are introduced

| | Parts |
|---|---|
| Cuprous chloride | 200 |
| Ammonium molybdate | 10 |
| Boric acid | 10 | while raising the temperature to 185-190°. The formation of the dyestuff being complete the melt is worked up as described in Examples 7 and 8. It represents a blue powder which in form of its sodium salt is easily soluble in water.

Example 10

Into a melt of 300 parts of urea there are introduced at 150°

| | Parts |
|---|---|
| Trimellitic acid | 25.8 |
| 4-sulphophthalic acid | 30 |
| Crystallized copper chloride | 11.4 |
| Ammonium molybdate | 0.5 | and stirred, until the formation of the dyestuff is complete. On working up as described in Example 2 the copper phthalocyanine disulphonic dicarboxylic acid (which probably has been formed as chief product) is isolated in form of its alkali metal salt; it is easily soluble in water with a greenish-blue coloration and shows a slight affinity towards cotton.

Example 11

Into a melt of 60 parts of urea there are introduced at 150°

| | Parts |
|---|---|
| 4-sulphophthalic acid | 10 |
| 2.4.5-biphenyltricarboxylic acid | 11.6 |
| Crystallized copper chloride | 3.6 |
| Ammonium molybdate | 0.1 | and stirred, until the formation of the dyestuff is complete. The dyestuff is isolated as described in Example 2. The diphenyl-dicarboxylic copperphthalocyanine-disulphonic acid (which probably has been formed as chief product) is soluble in water with a green coloration; in form of its alkali metal salt; it dyes cotton clear green shades.

Example 12

Into a melt of 125 parts of urea there are introduced at 150°

| | Parts |
|---|---|
| The ammonium salt of 4-sulphophthalic acid | 26.3 |
| Biphenyl-3.4-dicarboxylic acid | 24.2 |
| Crystallized copper chloride | 9.5 |
| Ammonium molybdate | 0.5 | and stirred, until the formation of the dyestuff is complete. The dyestuff is then isolated as described in Example 2. The diphenyl copper phthalocyanine-disulphonic acid (which probably has been formed as chief product) is soluble in the form of its alkali metal salt with a green coloration and dyes cotton green shades.

Example 13

| | Parts |
|---|---|
| Phthalic acid sulphochloride | 264.5 |
| Phthalic acid anhydride | 148 |
| Urea | 1250 | are heated to 150°, whereupon there is introduced a mixture of

| | Parts |
|---|---|
| Cuprous chloride | 82 |
| Ammonium molybdate | 4 |
| Boric acid | 4 |

The whole is then heated to 180-190°, until the formation of the dystuff is complete. After dissolving the melt in a dilute sodium carbonate solution and after filtration the dyestuff is salted out by means of sodium chloride. After drying it represents a violet-blue, bronze water soluble mass.

Example 14

| | Parts |
|---|---|
| Phthalic acid sulphamide | 245 |
| Phthalic acid anhydride | 148 |
| Urea | 1200 | are heated to 150°, whereupon there is introduced a mixture of

| | Parts |
|---|---|
| Cuprous chloride | 80 |
| Ammonium molybdate | 4 |
| Boric acid | 4 | whereupon the temperature is raised to 180-190°, until the formation of the dyestuff is complete. On boiling the melt with dilute hydrochloric acid, the dyestuff is sucked off and dried. The product thus obtained represents a bronze mass which is soluble in a dilute sodium carbonate solution with a blue coloration.

Example 15

| | Parts |
|---|---|
| Phthalic acid sulphochloride | 793.5 |
| Phthalic acid anhydride | 148 |
| Urea | 2800 | are heated to 150°, whereupon there is introduced a mixture of

| | Parts |
|---|---|
| Cuprous chloride | 190 |
| Ammonium molybdate | 40 |
| Boric acid | 40 | whereupon the temperature is raised to 180-190°, until the formation of the dyestuff is complete. On diluting the melt with hot water the solution is acidified by means of hydrochloric acid, salted out by means of sodium chloride, whereupon the dyestuff is filtered by suction, redissolved in water, rendered alkaline by means of soda lye, salted out again, filtered and dried. The dyestuff is obtained in form of a violet-blue bronze mass which is soluble in water.

Example 16

| | Parts |
|---|---|
| Diphenyl-3.4-dicarboxylic acid | 242 |
| Phthalic acid sulphochloride | 264.5 |
| Urea | 1500 | are heated to 150°, whereupon there is introduced a mixture of

| | Parts |
|---|---|
| Cuprous chloride | 100 |
| Ammonium molybdate | 5 |
| Boric acid | 5 | whereupon the temperature is raised to 180-190°, until the formation of the dyestuff is complete. On working up as described in the foregoing examples a bluish-green water soluble dyestuff is obtained.

Example 17

| | Parts |
|---|---|
| Phthalic acid sulphamide | 245 |
| 4.5-dichlorophthalic acid anhydride | 217 |
| Urea | 1500 | are heated to 150°, whereupon there is introduced a mixture of

| | Parts |
|---|---|
| Cuprous chloride | 90 |
| Ammonium molybdate | 5 |
| Boric acid | 5 | whereupon the temperature is raised to 180–190°, until the formation of the dyestuff is complete. After working up in the usual manner the dyestuff is obtained in form of a greenish-blue crystal mass.

*Example 18*

An intimate mixture of

| | Parts |
|---|---|
| The potassium salt of sulphophthalic acid | 14.2 |
| Phthalic acid anhydride | 7.4 |
| Copper chloride | 5 |
| Ammonium molybdate | 0.3 |
| The ammonium salt of amido sulphonic acid | 100 | is heated to 180–190° until the formation of the dyestuff has ceased, a dyestuff which is completely soluble in water being thus obtained.

We claim:

1. The process which comprises causing a copper compound and urea to react at an elevated temperature upon a mixture of a benzene-o-dicarboxylic acid containing in 4-position on the nucleus a sulphonic acid radical selected from the group consisting of —$SO_3H$, $SO_2Cl$ and —$SO_2.NH_2$, and a benzene-o-dicarboxylic acid being free from such substituent.

2. The process as claimed in claim 1 wherein cupric chloride is employed as copper compound.

3. The process which comprises causing a copper compound and urea to react at an elevated temperature upon a mixture of about equimolecular quantities of a benzene-o-dicarboxylic acid containing as one constituent a sulphonic acid radical selected from the group consisting of —$SO_3H$, $SO_2Cl$ and —$SO_2.NH_2$, and a benzene-o-dicarboxylic acid being free from such substituent.

4. The process which comprises causing a copper compound and a urea to react at an elevated temperature upon a mixture of a benzene-o-dicarboxylic acid containing in 4-position on the nucleus a sulphonic acid radical selected from the group consisting of —$SO_3H$, —$SO_2Cl$ and —$SO_2.NH_2$, and a benzene-o-dicarboxylic acid being free from such substituent, the molecular proportion of the o-phthalic acid being about 3:1.

5. Phthalocyanines of the benzene series having from 2 to 3 of the benzene nuclei substituted by one sulphonic acid group each, the sulphonic acid groups being attached to the benzene nuclei in 4-position.

6. Phthalocyanines of the benzene series having from 2 to 3 of the benzene nuclei substituted by one sulphonic acid group each, the sulphonic acid groups being attached to the benzene nuclei in 4-position, the remaining benzene nuclei containing halogen atoms as substituents.

GEORG RÖSCH.
OTTO BAYER.
HANS HOYER.

CERTIFICATE OF CORRECTION.

Patent No. 2,285,359.　　　　　　　　　　　　　June 2, 1942.

GEORG RÖSCH, ET AL.

It is hereby certified that error appears in the printed specification of the above numbered patent requiring correction as follows: Page 4, second column, line 6, claim 3, for the words "as one constituent" read --in 4-position on the nucleus--; and that the said Letters Patent should be read with this correction therein that the same may conform to the record of the case in the Patent Office.

Signed and sealed this 27th day of October, A. D. 1942.

(Seal)

Henry Van Arsdale,
Acting Commissioner of Patents.